United States Patent
Yokomizo et al.

(10) Patent No.: US 8,166,290 B2
(45) Date of Patent: Apr. 24, 2012

(54) INFORMATION PROCESSING APPARATUS AND INFORMATION PROCESSING METHOD

(75) Inventors: So Yokomizo, Kawasaki (JP); Yoshiharu Ito, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 455 days.

(21) Appl. No.: 12/416,838

(22) Filed: Apr. 1, 2009

(65) Prior Publication Data

US 2009/0251727 A1    Oct. 8, 2009

(30) Foreign Application Priority Data

Apr. 2, 2008  (JP) ................................ 2008-096091

(51) Int. Cl.
*G06F 9/00* (2006.01)
*G06F 3/00* (2006.01)

(52) U.S. Cl. ................ 713/2; 713/1; 719/321

(58) Field of Classification Search .................. 713/1, 2; 719/321
See application file for complete search history.

(56) References Cited

U.S. PATENT DOCUMENTS

| | | | | |
|---|---|---|---|---|
| 6,374,353 B1 * | 4/2002 | Settsu et al. | ...................... | 713/2 |
| 7,174,447 B2 * | 2/2007 | Zimmer et al. | ................... | 713/1 |
| 7,461,247 B2 * | 12/2008 | van der Veen et al. | ............ | 713/2 |
| 7,624,260 B2 * | 11/2009 | Ethier et al. | ...................... | 713/2 |

FOREIGN PATENT DOCUMENTS

JP        2001-34480 A     2/2001

* cited by examiner

*Primary Examiner* — Stefan Stoynov
(74) *Attorney, Agent, or Firm* — Canon USA Inc. IP Division

(57) ABSTRACT

An information processing apparatus including a hardware device, at least one application program configured to execute an operation utilizing the hardware device, an operating system, a first device driver and a second device driver to manage the hardware device, a first storage unit configured to store the first device driver and the second device driver, and a second storage unit configured to include a storage area for operating the first device driver and the second device driver using the operating system. The operating system controls the first storage unit and the second storage unit to load the second driver on the storage area in response to booting of the information processing apparatus. The operating system also controls the first storage unit and the second storage unit to load the first device driver on the storage area when a predetermined condition is satisfied after booting the information processing apparatus.

12 Claims, 15 Drawing Sheets

FIG. 13

| DEVICE DRIVER | WAIT TIME (SECOND(S)) |
|---|---|
| LCD DRIVER(123) | 0 |
| PRINTER DRIVER(124) | 0 |
| SCANNER DRIVER(125) | 0 |
| HDD DRIVER(126) | 0 |
| NETWORK DRIVER(127) | 20 |
| FAX DRIVER(128) | 25 |

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

An information processing apparatus having a hardware device (hereinafter also referred to as a "device"), the hardware device maybe controlled using an operating system (OS) operating on the information processing apparatus.

An application program operating on the OS controls the hardware device via a device driver. If the application program operating on the OS directly controls the hardware device and a plurality of requests have been issued to the hardware device from a plurality of application programs, the application program may not determine which request is to be processed. In order to avoid this issue, an application program operating on the OS may control the hardware device via a device driver.

An OS operating on an information processing apparatus, during booting of the information processing apparatus, loads a device driver from a non-volatile storage unit (a hard disk, for example) on a volatile storage unit (a dynamic random access memory (DRAM), for example) to control a hardware device (see Japanese Patent Application Laid-Open No. 2001-34480, for example).

Reducing the time required to boot an information processing apparatus having a hardware device is a desired quality.

However, loading a device driver on a storage area (a storage area on a DRAM, for example) to operate the device driver during booting of the information processing apparatus, may require a significant amount of time to completely load the device driver. In particular, the data size of a device driver for a hardware device having a plurality of complex functions is large. Accordingly, the time taken to load such a device driver can be long.

In a method discussed in Japanese Patent Application Laid-Open No. 2001-34480, a plurality of device drivers are previously designated to inform an OS whether a particular device driver from the plurality of device drivers should be loaded at the time of booting an information processing apparatus or not to be loaded at the time of booting. For a device driver that is previously designated as not to be loaded at the time of booting, control is executed to load the device driver only when the device driver has been accessed.

Accordingly, the time taken to boot an information processing apparatus can be reduced compared to loading all of the device drivers that the OS operating on the information processing apparatus can load during booting of the information processing apparatus.

In the conventional method discussed in Japanese Patent Application Laid-Open No. 2001-34480, when an application program managed by the OS has accessed a device whose device driver has not been loaded, a compliant device driver is loaded. The application program waits until the device driver is loaded and a response is received from the OS. Accordingly, processing by the application program may be delayed.

When the application program has issued a request for configuration information indicating the configuration of a hardware device, the OS may notify only the configuration information to the application program.

However, the device driver to be loaded may include information other than the configuration information. Accordingly, the application program cannot receive the configuration information until other information is also loaded after loading the configuration information.

SUMMARY OF THE INVENTION

The present invention is directed to an information processing apparatus having a hardware device for reducing the time to boot an information processing apparatus and reduce processing time by an application program that executes an operation utilizing the hardware device.

According to an aspect of the present invention, an information processing apparatus includes a hardware device, at least one application program configured to execute an operation utilizing the hardware device, an OS configured to manage the at least one application program, a first device driver configured to manage the hardware device and includes hardware control information for controlling the hardware device, a second device driver configured to manage the hardware device and includes device information about the hardware device, a first storage unit configured to store the first device driver and the second device driver, a second storage unit configured to include a storage area for operating the first device driver and the second device driver via the OS. The OS is configured to control the first storage unit and the second storage unit to load the second device driver on the storage area in response to booting of the information processing apparatus and load the first device driver on the storage area when a predetermined condition is satisfied after booting the information processing apparatus.

Further features and aspects of the present invention will become apparent from the following detailed description of various embodiments with reference to the attached drawings.

BRIEF DESCRIPTION OF THE DRAWINGS

The accompanying drawings, which are incorporated in and constitute a part of the specification, illustrate various embodiments, features, and aspects of the invention and, together with the description, serve to explain the principles of the present invention.

FIG. 13 illustrates an example of a table indicating wait time for starting to load a device driver according to a third embodiment of the present invention.

DETAILED DESCRIPTION OF THE EMBODIMENTS

Various embodiments, features, and aspects of the present invention will now be described in detail below with reference to the drawings. It is noted that the relative arrangement of the components, the numerical expressions, and numerical values set forth in these embodiments are not intended to limit the scope of the present invention.

Figure 2:
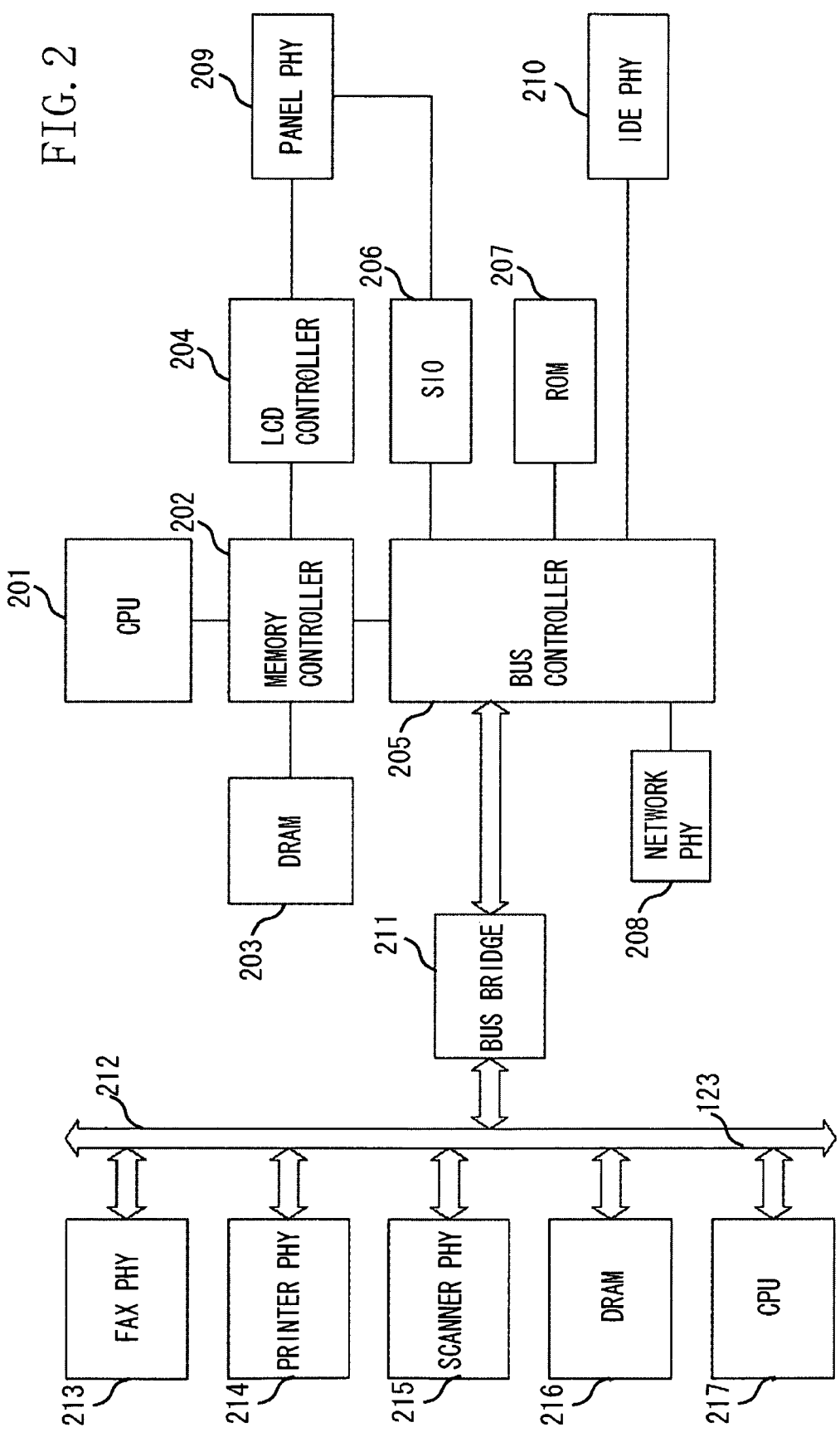
FIG. 2 illustrates an exemplary hardware configuration of an information processing apparatus according to the first embodiment of the present invention.

A first embodiment of the present invention will now be described in detail below. FIG. 2 illustrates a hardware configuration of an information processing apparatus according to the first embodiment of the present invention. The information processing apparatus according to the present embodiment is a multifunction peripheral (MFP) having a plurality of functions such as a copy function, a facsimile transmission function, and a printer function. However, the present invention is not limited to this embodiment. A personal computer (PC) may be used as the information processing apparatus according to the present embodiment.

Referring to FIG. 2, a CPU 201 is connected to a memory controller 202. The CPU 201 loads and executes various programs from a DRAM 203, connected to the memory controller 202. The DRAM 203 can store various data such as operation data or other data in addition to the program. The memory controller 202 is connected to an LCD controller 204 and a bus controller 205.

A serial communication interface controller (SIO) 206 and a read-only memory (ROM) 207 are connected to the bus controller 205. The bus controller 205 includes an Integrated Drive Electronics (IDE) physical layer (PHY) 210, which is a connector for connecting to a hard disk, and a network PHY 208, which is a connector for connecting to a network cable. The bus controller 205 can function as a hard disk controller and a network controller.

The LCD controller 204 and the SIO 206 are connected to a panel PHY 209. An operation panel 220 (FIG. 3) having an LCD panel (touch panel), enabling a user to operate the information processing apparatus, is connected to the panel PHY 209. The operation panel 220 is described in detail below with reference to FIG. 3.

The ROM 207 stores a setting value for operating the information processing apparatus and a boot program necessary for booting up the information processing apparatus.

The information processing apparatus includes a CPU 217. The CPU 217 is in communication with a DRAM 216 and various hardware devices such as hardware devices (PHYs) 213 through 215 via a bus 212. The DRAM 216 stores various programs that are executed by the CPU 217 and various data.

The bus 212 is connected to the bus controller 205 via a bus bridge 211. Various data stored on the DRAM 203 may be transmitted to the DRAM 216 via the bus controller 205, the bus bridge 211, and the bus 212. The data may also be transmitted in a reverse direction.

The CPU 201 and the CPU 217 can communicate with each other via the bus bridge 211. Accordingly, the CPU 201 can control hardware units connected to various hardware devices (PHYs) 213 through 215 by communicating with the CPU 217. The CPU 201 can load and write on the DRAM 216 the program executed by the CPU 217 from a hard disk (HDD), which is connected to the connector (IDE PHY) 210. The HDD is a non-volatile first storage unit while the DRAM 216 is a volatile second storage unit.

The operation panel 220 is connected to the panel PHY 209 and described in detail below.

Figure 3:
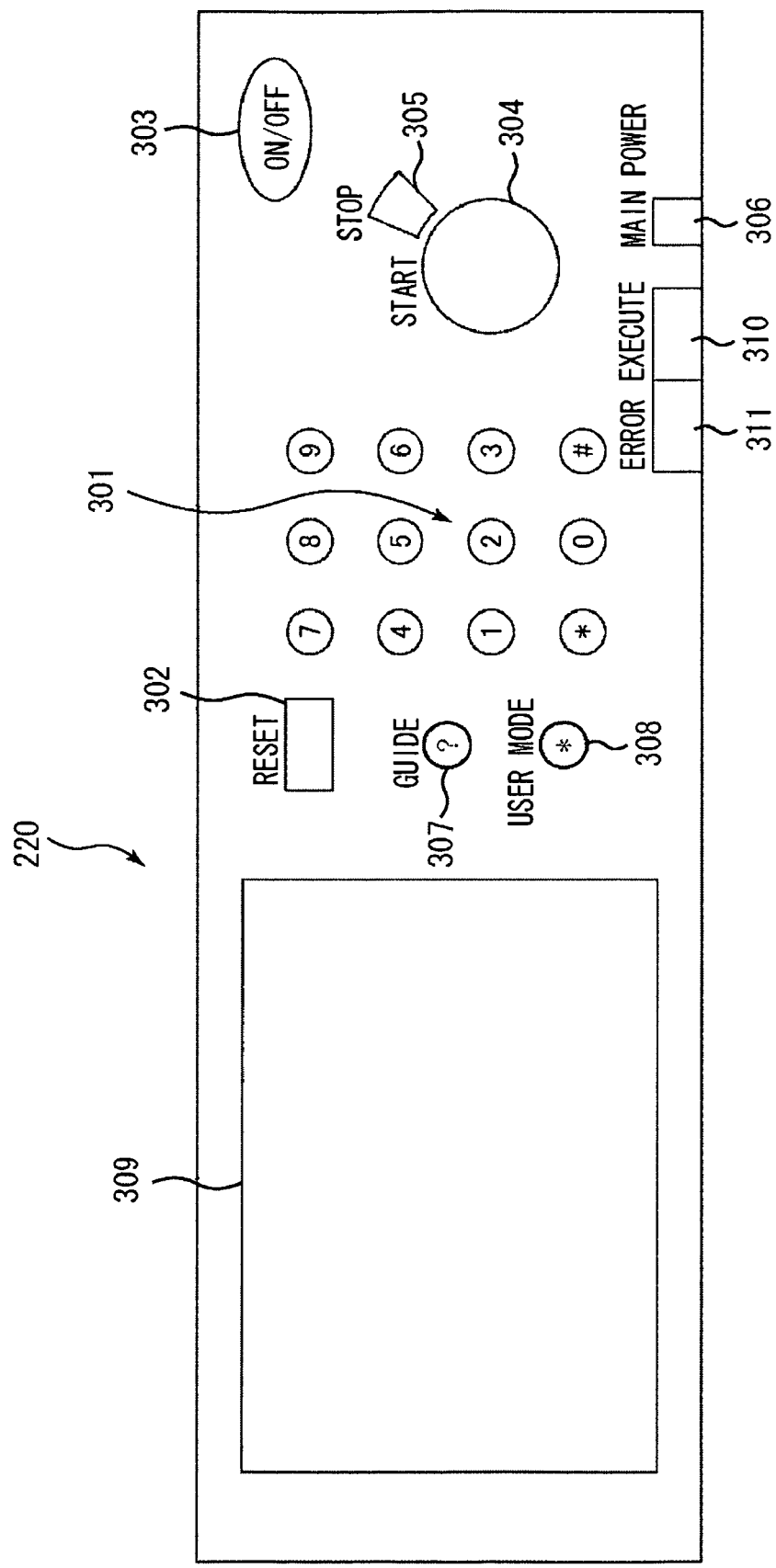
FIG. 3 illustrates an exemplary external appearance of an operation panel of the information processing apparatus according to the first embodiment of the present invention.

FIG. 3 illustrates an external appearance of the operation panel 220 according to the present embodiment.

The operation panel 220 includes numeral keys 301. The numeral keys 301 are operated by the user of the information processing apparatus to input various parameters and information. The operation panel 220 includes a reset button 302. The reset button 302 can be operated by the user to clear (cancel) a setting that has been input by the user via the operation panel 220.

The operation panel 220 includes a software power button 303. The software power button 303 can be operated by the user to issue an instruction for powering on and off the information processing apparatus. A start button 304 can be operated by the user to issue an instruction for starting various functions such as the facsimile transmission function and the copy function. A stop button 305 can be operated by the user to suspend a currently executed function.

A light-emitting diode (LED) 306 indicates whether the information processing apparatus has been powered on or off. An LED 310 indicates a status of a job that is currently executed in the information processing apparatus. An LED 311 indicates information about an error occurring on the information processing apparatus. The LEDs can be set to an off state, a green-lit state, a green blinking state, or an orange-lit state in a serial communication by the SIO 206.

A help (guide) key 307 can be operated by the user to display and refer to various help screens for operating the information processing apparatus. A user mode key 308 can be operated by the user to change the operation mode of the information processing apparatus to the user mode.

The operation panel 220 includes a touch panel 309, which includes a liquid crystal display device. When the user operates various buttons or the touch panel 309 on the operation panel 220, the operation information is notified to the CPU 201 via the panel PHY 209 and the SIO 206.

The CPU 201 displays the touch panel 309 and updates information displayed on the touch panel 309 by controlling the LCD controller 204 according to the program stored on the DRAM 203. The CPU 201 executes control for lighting on and off the LEDs by controlling the SIO 206.

The functions of the information processing apparatus according to the present embodiment will be described in detail below.

Before issuing an instruction for starting a copy job, the user sets a document on a scanner unit (not illustrated), which is connected to the scanner PHY 215, and operates the operation panel 220 to perform setting of the copy job. The setting of the copy job includes a setting of the number of copies, a method for sorting output products, and a magnification ratio for reading the document. The setting values are stored on the DRAM 203. When the user presses the start button 304, the CPU 201 detects that the start button 304 has been pressed and instructs the CPU 217 to drive the scanner unit.

The CPU 201 notifies the setting value of the magnification ratio and information about a transmission destination of the acquired image data to the CPU 217 in addition to the instruction to drive the scanner unit. The destination of transmission of image data from the scanner unit is specified to be the DRAM 203 or the DRAM 216. After receiving the above-described instruction and information from the CPU 201, the CPU 217 drives the scanner unit via the scanner PHY 215 according to the received instruction and information.

The scanner unit forms image data by optically scanning the document set by the user. The image data read by the scanner unit is then stored on the DRAM 216. After the image data is subjected to predetermined image processing, the image data is transmitted to and stored on the image data transmission destination specified by the CPU 201. It is also useful if the CPU 201 stores the image data on a hard disk connected to the IDEPHY 210.

The CPU 201 issues an instruction to the CPU 217 for printing the acquired image data with a printer engine (not illustrated), connected to the printer PHY 214. After receiving the print instruction from the CPU 201, the CPU 217 controls the printer engine to print the instructed image data via the printer PHY 214. The printer engine prints the image data on a printing sheet according to the instruction from the CPU 217.

The print instruction to the printer engine is issued page by page. When a document having a plurality of pages is set on the scanner unit, the CPU 201 instructs the CPU 217 to print image data for a plurality equivalent to the number of pages of the document. When the user has instructed a sorting method via the operation panel 220, the sorting function is implemented by the CPU 201 specifying the image data to be printed according to the sorting method instructed by the user.

Facsimile transmission processing according to the present embodiment is described in detail below. Before starting a facsimile transmission job, the user sets a document on the scanner unit connected to the scanner PHY 215. The user operates the operation panel 220 to enter a telephone number of a transmission destination and make a setting for reading an image of the document.

When the user presses the start button 304, the CPU 201 detects that the start button 304 has been pressed and instructs the CPU 217 to drive the scanner unit to read an image of the document. The read image data is then stored on the DRAM 203, the hard disk, or the DRAM 216.

The CPU 201 instructs the CPU 217 to transmit the stored image data to a transmission destination corresponding to the designated telephone number by using a facsimile transmission unit (not illustrated), which is connected to the FAXPHY 213. The CPU 217 transmits the image data designated by the CPU 201 to the transmission destination corresponding to the designated telephone number by controlling the facsimile transmission unit via the FAXPHY 213.

Processing for receiving a facsimile according to the present embodiment is described in detail below. When the image data is received via facsimile, the facsimile transmission unit notifies the CPU 217 that the image data has been received. The facsimile transmission unit transmits and stores the image data received from a transmission source apparatus on the DRAM 216.

The CPU 217 notifies the CPU 201 that the image data has been received via facsimile together with the image data and information thereof. The CPU 201 instructs the CPU 217 to output the received image data with the printer engine. The printer engine prints the image data received via the facsimile transmission unit.

Document data such as page description language (PDL) data generated by the user is transmitted to the information processing apparatus via the network via the connector 208. The document data received via the connector 208 is temporarily stored on the DRAM 203. The CPU 201 interprets the document data stored on the DRAM 203 and converts the document data into image data. The CPU 201 stores the image data on the DRAM 203. The CPU 201 instructs the CPU 217 to output the image data with the printer engine. The CPU 217 controls the printer engine to print the image data via the printer PHY 214.

The image data output and printed by the above-described copy function, facsimile transmission function, and printer function may be stored on the hard disk connected to the IDEPHY 210. Image data that has been printed may be used again. When processing a plurality of pieces of image data, image data stored on the DRAM 203 is transmitted to the hard disk and the transmitted image data is deleted from the DRAM 203. With this configuration, during processing of the image data, other image data can be read or generated. This configuration may increase the speed at which the job is processed.

Figure 1:
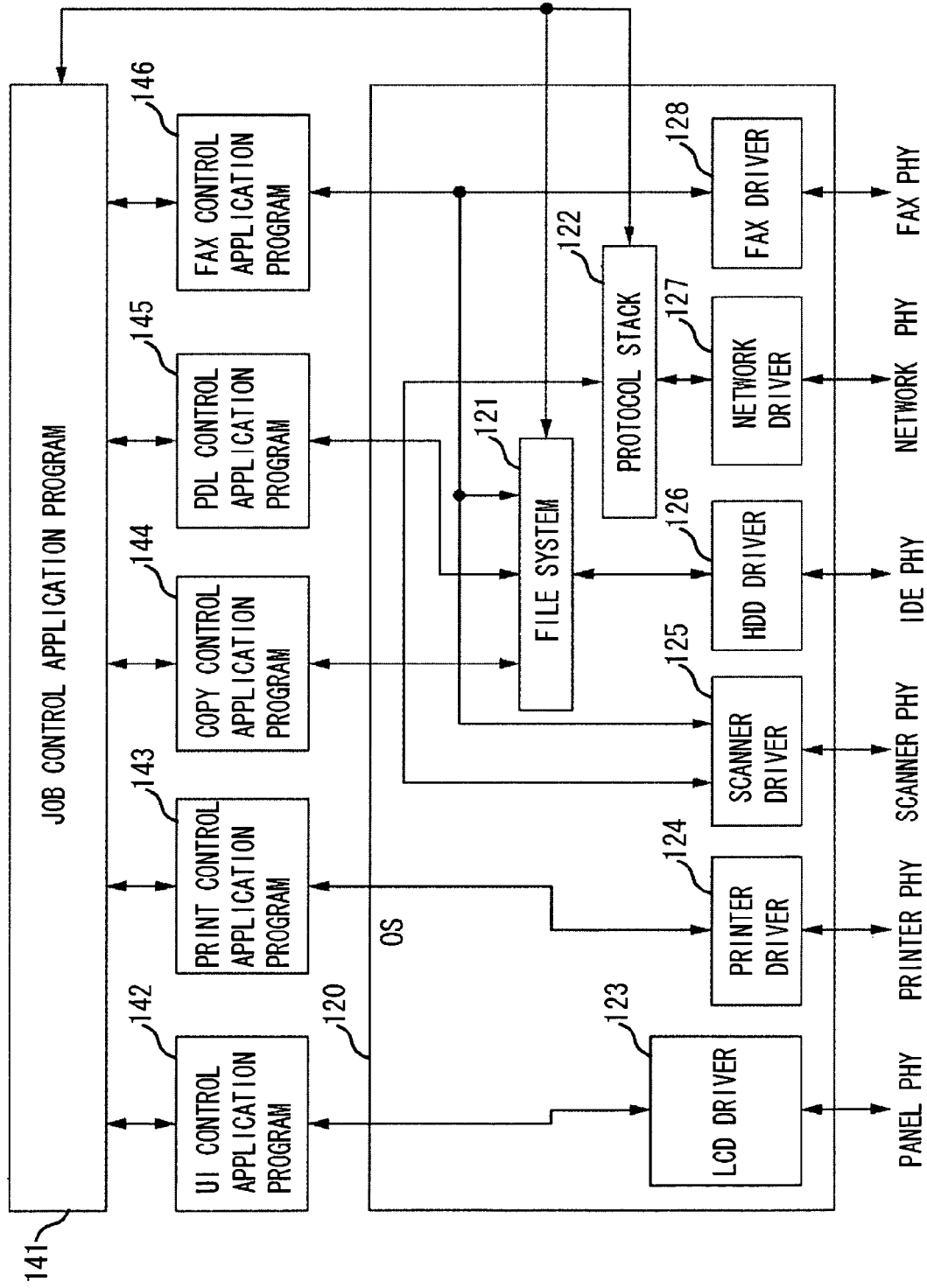
FIG. 1 illustrates an exemplary software configuration of an information processing apparatus according to a first embodiment of the present invention.

An exemplary configuration of software system executed by the CPU 201 will be described in detail below with reference to FIG. 1. FIG. 1 illustrates a software configuration of the information processing apparatus according to the present embodiment.

FIG. 1 illustrates a configuration of a software system executed by the CPU 201 of the information processing apparatus according to the present embodiment.

Referring to FIG. 1, a job control unit 141, which controls a job, operates on an OS 120. A user interface (UI) control application program 142, controls the operation panel 220, operates on the OS 120. A print control application program 143 operates on the OS 120. The print control application program 143 is connected to the printer PHY 214 and controls the printer engine.

A copy control application program 144 operates on the OS 120, controls the copy processing. A PDL control application program 145, operates on the OS 120, controls the printer function. A facsimile transmission control application program 146, operates on the OS 120, controls the facsimile transmission function.

The OS 120 supports various file systems, such as file allocation table (FAT) or Second Extended File system (ext2). A "file system" refers to a system for efficiently storing a file on a hard disk to acquire the file when necessary.

The application program operating on the OS 120 can utilize the file system by operating a public application interface (API) released by the OS 120. For example, the copy control application program 144 can efficiently store the image data read with the scanner unit on the hard disk by operating the API. By acquiring the image data stored on the hard disk in an arbitrary order, the image data can be printed on a sheet with various layouts (by reverse order printing and n-up printing).

The facsimile transmission control application program 146 can store the image data received via facsimile on the hard disk by operating the API. The image received via facsimile can be reused. The PDL control application program 145 can efficiently store the image data obtained by interpreting the received image data on the hard disk by operating the API.

The image data generated may not be deleted before being output to the printer engine. After generating image data of a predetermined number of images, it may be necessary for the PDL control application program 145 to suspend the interpretation processing until the image data is printed by the printer engine. By storing the image data on the hard disk, the number of images that can be stored at the same time can be increased. Accordingly, the frequency of suspension of the interpretation processing by the PDL control application program 145 may be reduced.

A file system 121 operates a hard disk driver 126, which controls a hard disk controller installed in the bus controller 205. The bus controller 205 functions as a controller for the hard disk connected to the IDEPHY 210. Data can be transmitted to and from the HDD.

The OS 120 supports various network protocols such as Transmission Control Protocol/Internet Protocol (TCP/IP) and user datagram protocol (UDP). An OS supports a network protocol in a layer lower than the application layer of the Open Systems Interconnection (OSI) Reference Model.

A protocol stack 122 provides an interface to the application program operating on the OS 120. The application program can communicate with an external apparatus by various protocols by operating the interface. For example, the PDL control application program 145 utilizes the interface to receive document data that has been transmitted from an external apparatus. The job control application program 141 utilizes the interface to communicate with the external apparatus by simple network management protocol (SNMP).

The protocol stack 122 communicates with the external apparatus connected to the information processing apparatus via the connector 208 by operating a network driver 127, which controls the network controller installed in the bus controller 205. The UI control application program 142 displays an image on the touch panel 309 by operating the LCD driver 123, which controls the LCD controller 204 and the SIO 206.

The UI control application program 142 receives a command input by the user operating the operation panel 220. The UI control application program 142 changes the screen according to the user operation and instructs the job control unit 141 to execute the operation desired by the user.

The print control application program 143 prints various image data on a sheet by operating a printer driver 124, which controls the printer engine connected to the printer PHY 214. The image data to be printed is designated by the job control application program 141.

The copy control application program 144 operates a scanner driver 125 according to an instruction from the UI control application program 142. The scanner driver 125 controls the scanner unit connected to the scanner PHY 215. The copy control application program 144 reads an image of the document set on the scanner unit and generates image data of the document.

The copy control application program 144 writes the image data generated on the hard disk by operating the file system 121. The copy control application program 144 transmits the image data to an external information processing apparatus by operating the protocol stack 122. The copy control application program 144 issues an instruction to print the image data to the job control unit 141.

The job control application program 141 issues an instruction to print the designated image data to the print control application program 143.

In the present embodiment, the copy control application program 144 stores the image data obtained by reading the document on the hard disk. The present embodiment can print the image data in sorting order described in the instruction issued from the UI control application program 142 by controlling the printing order of the image data to be printed.

The PDL control application program 145 interprets various document data it receives such as PDL data and converts the data into image data by using the protocol stack 122. The PDL control application program 145 issues an instruction to print the image data to the job control application program 141. The job control application program 141 issues an instruction to print the designated image data to the print control application program 143.

The facsimile transmission control application program 146 operates according to the instruction from the UI control application program 142 or a call accept event from a FAX driver 128, which controls the facsimile transmission unit connected to the FAXPHY 213. When the UI control application program 142 has instructed transmitting of a facsimile, the facsimile transmission control application program 146 operates the scanner driver 125, which controls the scanner unit connected to the scanner PHY 215, to read an image of the document set on the scanner unit.

The facsimile transmission control application program 146 transmits the read image data by facsimile to a transmission destination corresponding to the telephone number designated by the UI control application program 142. The facsimile transmission control application program 146 operates the FAX driver 128, which controls the facsimile transmission unit connected to the FAXPHY 213.

When a call accept event is notified from the FAX driver 128, the facsimile transmission control application program 146 reads the image data received by the call and, issues an instruction to print the image data to the job control application program 141. The job control application program 141 instructs the print control application program 143 to print the image data designated by the facsimile transmission control application program 146.

Figure 4:
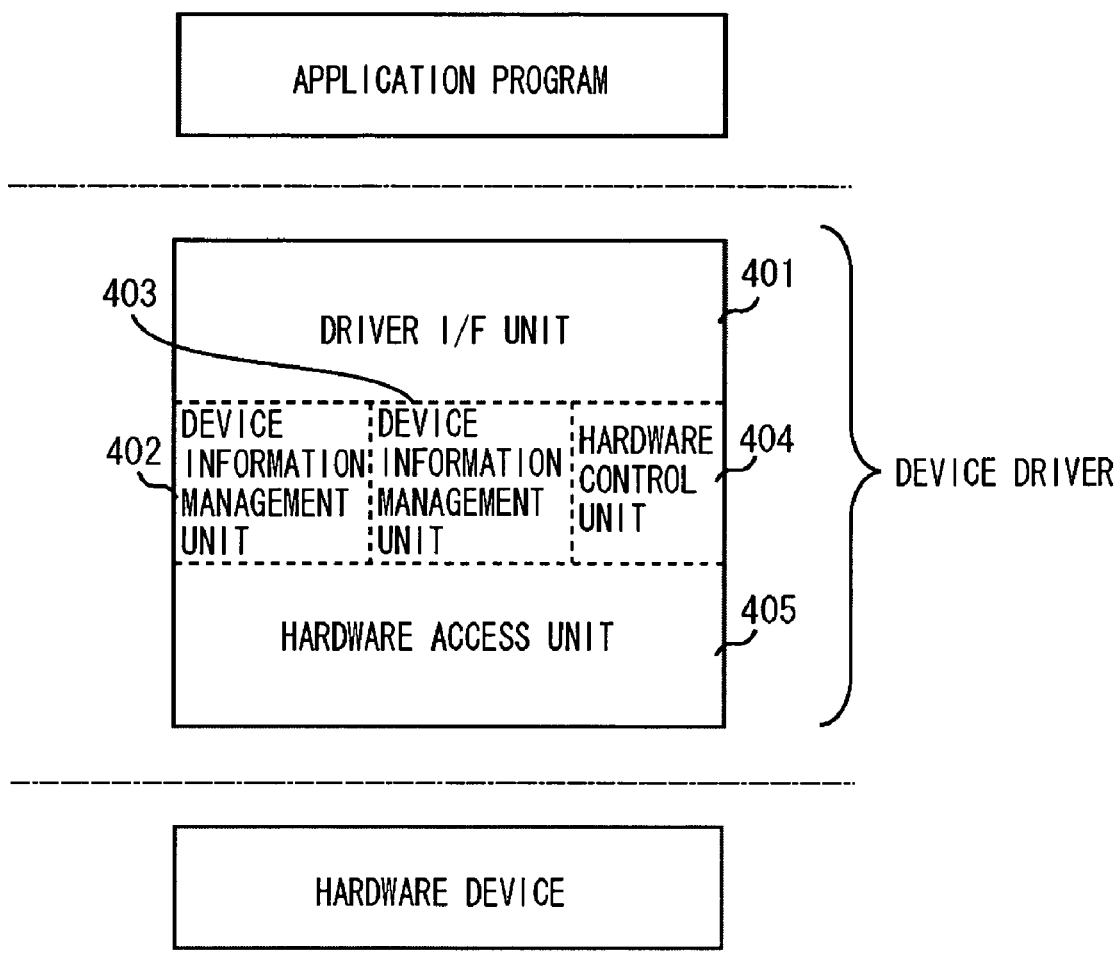
FIG. 4 illustrates an exemplary inner configuration of a device driver according to the first embodiment of the present invention.

An inner configuration of a device driver will be described in detail below with reference to FIG. 4. FIG. 4 illustrates an inner configuration of a device driver according to the present embodiment.

Referring to FIG. 4, a driver interface (I/F) 401 receives a request from the application program. The driver I/F 401 functions as an interface for transmitting a response to the request, to the application program. The driver I/F 401 is constituted by a program for opening the device driver, a program for closing the device driver, a program for issuing a request to the driver, and a program for reading and writing data.

A device information management unit 402 includes a program for managing device information of the hardware device. The "device information" includes information indicating that the hardware device managed by the device driver is in a normal operation state (the hardware device normally operates) or in an abnormal operation state (or the hardware device is not connected to the information processing apparatus). If the information processing apparatus is in the abnormal operation state, the device information includes information about the type of abnormal state.

The driver information management unit 403 is a program managing the driver information that indicates the operation status of the device driver. The operation status of the device driver includes whether the device driver was opened and is currently in operation. The operation state of the device driver includes the state of data transmission between the application program and the hardware device (a transmission waiting state, a currently-transmitting state, or the like).

A hardware control unit 404 includes a program for receiving a request from the application program input via the driver I/F 401 and controlling the hardware device according to the received request. The hardware control unit 404 manages a buffer used in transmitting data between the application program and the hardware device. If a plurality of requests has been issued from the application programs to the hardware device, the hardware control unit 404 executes exclusive selection processing for exclusively selecting request to be processed. In initializing the device driver, the hardware control unit 404 clears the buffer and initializes a software resource utilized in the exclusion processing.

A flag and a message queue can be used as the software resource.

A hardware access unit 405 includes a program for accessing a register of the hardware device in response to the request from the device information management unit 402 and the hardware control unit 404.

Figure 5:
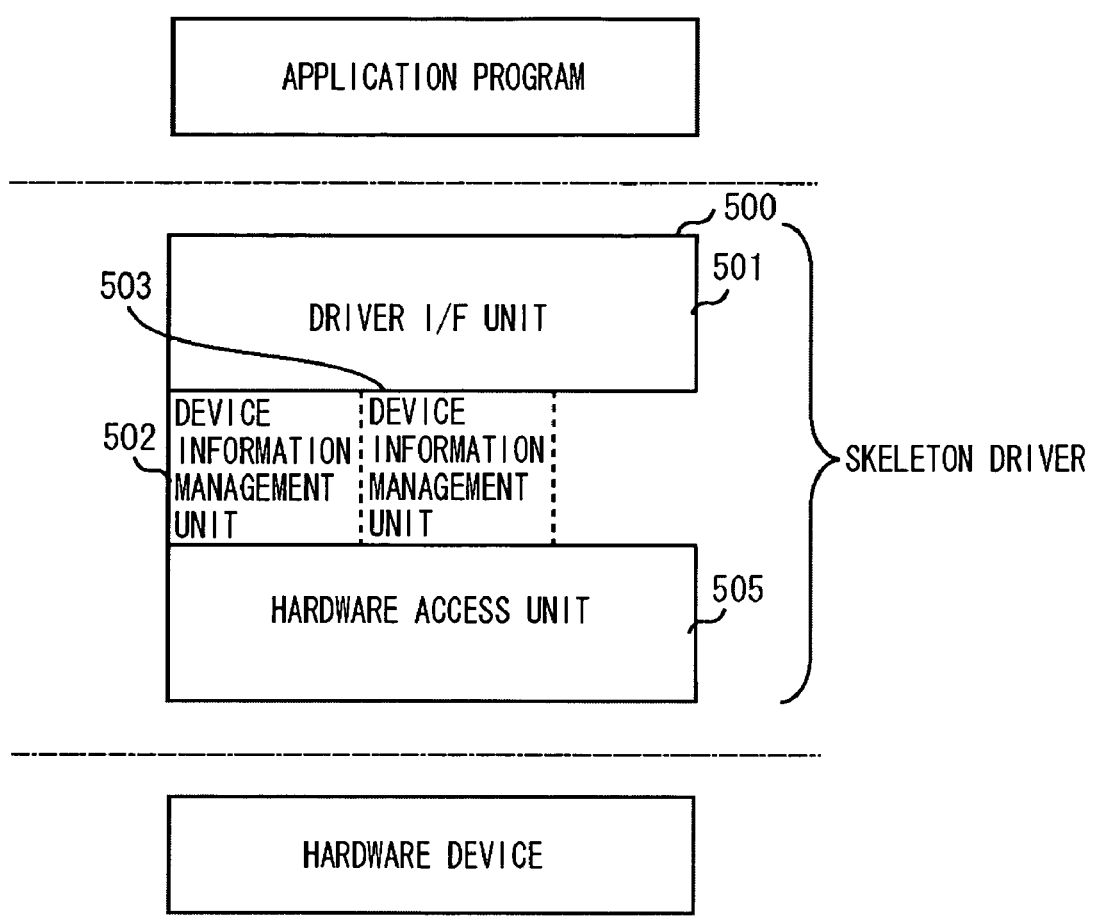
FIG. 5 illustrates an exemplary inner configuration of a skeleton driver according to the first embodiment of the present invention.
Figure 6:
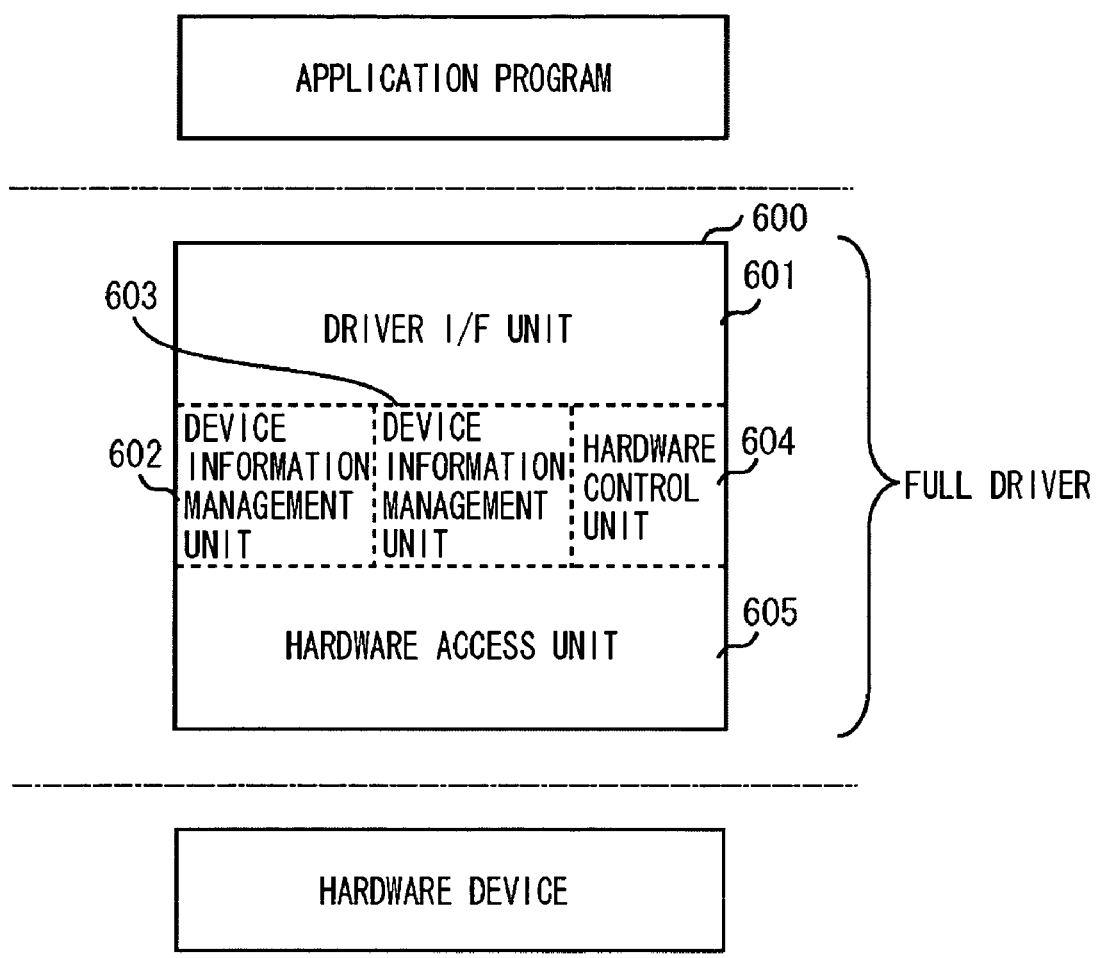
FIG. 6 illustrates an exemplary inner configuration of a full driver according to the first embodiment of the present invention.

An inner configuration of the device driver according to the present embodiment is described in detail below with reference to FIGS. 5 and 6. FIG. 5 illustrates an inner configuration of a skeleton driver 500, which is a second device driver according to the present embodiment. FIG. 6 illustrates an inner configuration of a full driver 600, which is a first device driver according to the present embodiment.

In the present embodiment, the skeleton driver 500 or the full driver 600 operates as the device drivers 123 through 128 described above with reference to FIG. 1.

The application program illustrated in FIGS. 5 and 6 is equivalent to either of the above-described programs 142 through 146. The hardware device illustrated in FIGS. 5 and 6 is equivalent to the device connected with either of the panel PHY 209, the printer PHY 214, the scanner PHY 125, the IDEPHY 210, the network PHY 208, and the FAXPHY 213.

The skeleton driver 500 illustrated in FIG. 5 differs from the device driver illustrated in FIG. 4 in that the skeleton driver 500 does not include a component corresponding to the hardware control unit 404. The full driver 600 illustrated in FIG. 6 has the configuration similar to that of the device driver illustrated in FIG. 4. The full driver 600 includes the hardware control unit 604, which is a component corresponding to the hardware control unit 404. The data size of the skeleton driver 500 is smaller than that of the full driver 600 depending on the hardware control unit 604, which is not included in the skeleton driver 500.

A driver I/F 501 of the skeleton driver 500 and a driver I/F 601 of the full driver 600 have the same configuration as that of the driver I/F 401 (FIG. 4). Accordingly, the description thereof will not be repeated here. A device information management unit 502 of the skeleton driver 500 and a device information management unit 602 of the full driver 600 have the same configuration as that of the device information management unit 402 (FIG. 4). Accordingly, the description thereof will not be repeated here.

A driver information management unit 503 of the skeleton driver 500 and a driver information management unit 603 of the full driver 600 have the same configuration as that of the driver information management unit 403 (FIG. 4). Accordingly, the description thereof will not be repeated here. A hardware control unit 604 of the full driver 600 has the same configuration as that of the hardware control unit 404 (FIG. 4). Accordingly, the description thereof will not be repeated here.

As described in detail below, the skeleton driver 500 is loaded from the HDD onto a predetermined storage area of the DRAM 203 during booting of the information processing apparatus. The data size of the skeleton driver 500 is smaller than that of the full driver 600. Accordingly, the time taken to load the skeleton driver 500 from the HDD on the DRAM 203 is shorter than the time taken to load the full driver 600.

If the device information management unit 502 stores the device information indicating that the hardware device is in the normal operation state, the skeleton driver 500 cannot control the hardware device because the skeleton driver 500 does not include a hardware control unit. The driver information management unit 503 stores the driver information indicating that the device driver is in an inoperable state (initialization is in progress) even if the device information indicates that the hardware device is in the normal operation state.

Both the skeleton driver 500 and the full driver 600 include the device information management unit and the driver information management unit. Accordingly, both the skeleton driver 500 and the full driver 600 can respond to a request for the device information of the hardware device and a request for the operation state of the driver.

Processing for powering on and booting the information processing apparatus according to the present embodiment is described in detail below.

When an operator (user) of the information processing apparatus presses a main power switch (not illustrated) of the information processing apparatus, the alternate current (AC) voltage is supplied from an external commercial power source to an AC/direct current (DC) conversion unit of the information processing apparatus. The AC/DC conversion unit supplies the DC voltage to each component and unit of the information processing apparatus to boot up the information processing apparatus.

Figure 7:
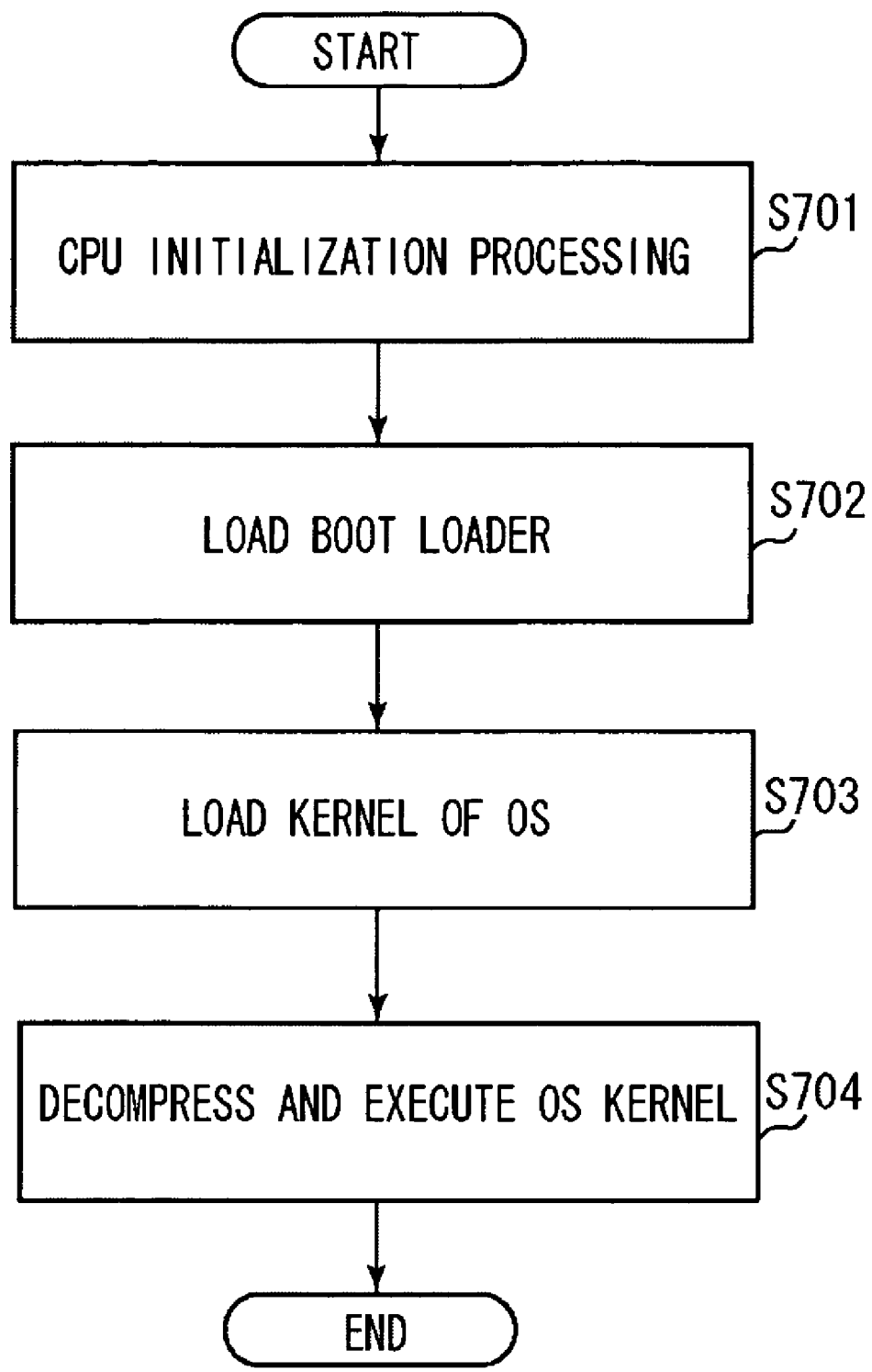
FIG. 7 is a flow chart illustrating exemplary processing executed by a central processing unit (CPU) of the information processing apparatus in booting the information processing apparatus according to the first embodiment of the present invention.

FIG. 7 is a flow chart illustrating processing executed by the CPU 201 when the information processing apparatus is powered on (booted) according to the present embodiment. FIG. 7 illustrates processing executed by the CPU 201 to start executing the OS 120.

Referring to FIG. 7, in step S701, the CPU 201 loads a basic input output system (BIOS) from the ROM 207 on the DRAM 203 and executes initialization processing. In step S702, the CPU 201 executes the BIOS from the DRAM 203 to load a boot loader from the ROM 207 on the DRAM 203.

In step S703, the CPU 201 executes the boot loader from the DRAM 203 to access the HDD via the IDEPHY 210. The CPU 201 loads the OS 120 from the HDD on the DRAM 203. In step S704, the CPU 201 starts executing the OS 120 from the DRAM 203.

Figure 8:
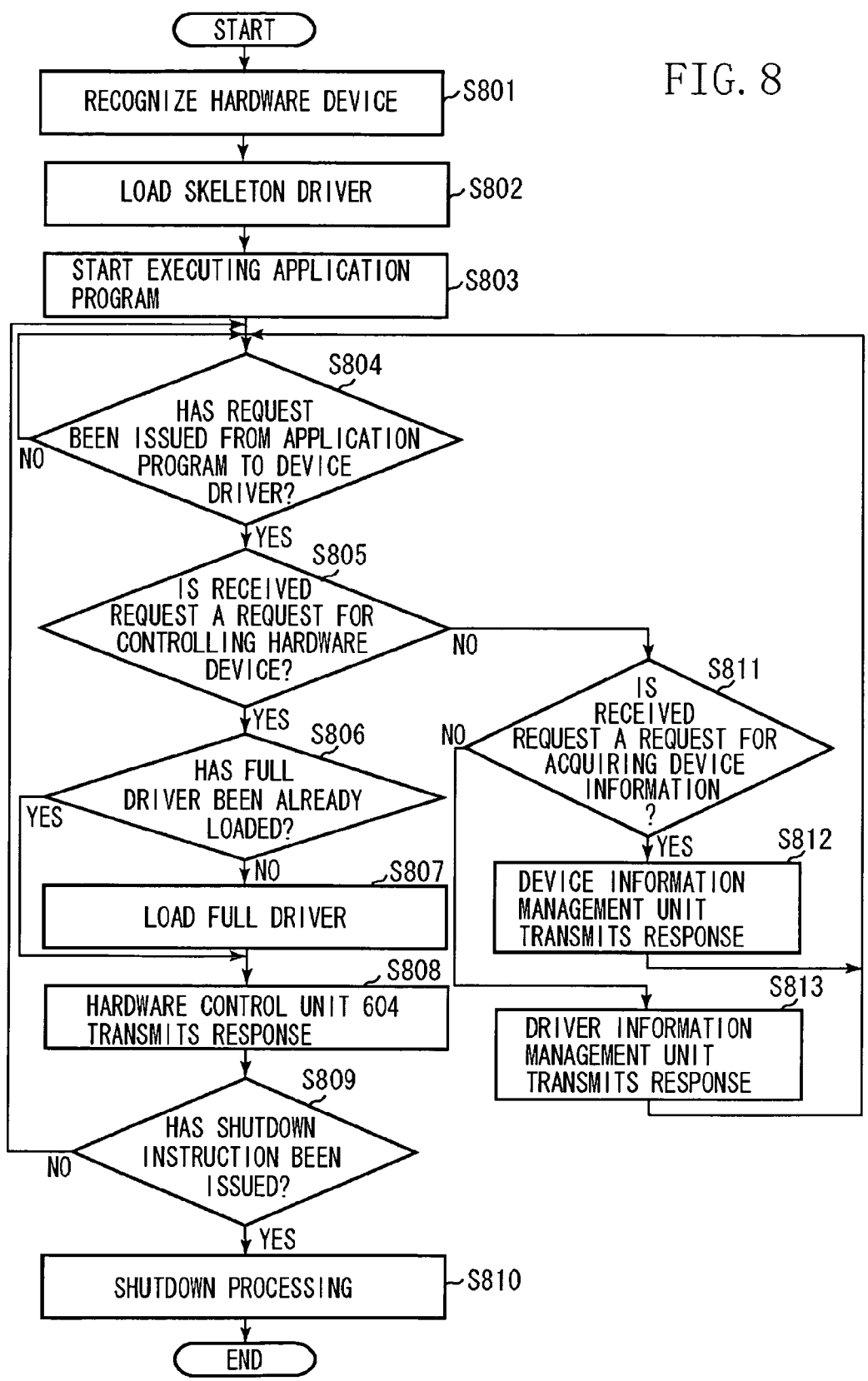
FIG. 8 is a flow chart illustrating exemplary processing executed by an OS of the information processing apparatus in booting the information processing apparatus according to the first embodiment of the present invention.

Processing executed by the OS 120 in booting the information processing apparatus is described in detail below with reference to FIG. 8. FIG. 8 is a flow chart illustrating processing executed by the OS 120 in booting the information processing apparatus according to the present embodiment. The processing in the flow chart in FIG. 8 is started when the CPU 201 starts executing the OS 120.

Referring to FIG. 8, in step S801, when the OS 120 has received a hardware connection signal from the bus controller 205, the OS 120 recognizes the hardware device of the information processing apparatus. The "hardware device" includes the device connected to either of the panel PHY 209

(FIG. 2), the printer PHY 214 (FIG. 2), the scanner PHY 125 (FIG. 2), the IDEPHY 210 (FIG. 2), the network PHY 208 (FIG. 2), and the FAXPHY 213 (FIG. 2).

In step S802, the OS 120 loads the skeleton driver 500 from the HDD on the DRAM 203. In step S803, the OS 120 starts executing the application program. The application program executed in step S803 includes the above-described programs 142 through 146. Because each application program has been stored on the HDD, the OS 120 loads the application program from the HDD on the DRAM 203.

The processing executed by the application program in step S803 will be described in detail below with reference to FIG. 9.

In step S804, the OS 120 determines whether any request has been issued to the device driver from the application program executed in step S803. If a request has been issued to the device driver (YES in step S804), then the processing advances to step S805. If no request has been issued (NO in step S804), the OS 120 returns to step S804.

In step S805, the OS 120 determines whether the request issued from the application program is a request for controlling the hardware device. If the request issued from the application program is a request for controlling the hardware device (YES in step S805), then the processing advances to step S806. If the request issued from the application program is not a request for controlling the hardware device (NO in step S805), then the processing advances to step S811.

In step S806, the OS 120 determines whether the full driver 600 has been loaded from the HDD on the DRAM 203. If the full driver 600 has been loaded from the HDD on the DRAM 203 (YES in step S806), then the processing advances to step S808. If the full driver 600 has not been loaded from the HDD on the DRAM 203 (NO in step S806), then the processing advances to step S807.

In step S807, the OS 120 loads the full driver 600 from the HDD on the DRAM 203. The full driver 600 is loaded here because the skeleton driver 500 does not include a hardware control unit for controlling the hardware device. The OS 120 changes the device driver for controlling the hardware device from the skeleton driver 500 to the full driver 600 when the full driver 600 is loaded.

In step S808, the OS 120 transmits a response to the request from the application program received in step S804 by using the hardware control unit 604 of the full driver 600. If the hardware device is a scanner and the application program is the facsimile transmission control application program 146, the facsimile transmission control application program 146 issues a request for reading the document with the scanner unit, to the full driver 600, which is the scanner driver 125.

In response to the request from the facsimile transmission control application program 146, the scanner driver 125 issues an instruction to read the document, to the scanner unit (scanner). The scanner driver 125 stores the image data obtained by reading the document, with the scanner on the DRAM 203. The scanner driver 125 notifies the facsimile transmission control application program 146 that the image data has been stored on the DRAM 203.

In step S809, the OS 120 determines whether an instruction to shut down the OS 120 has been issued. If the instruction to shut down the OS 120 has been issued (YES in step S809), then the processing advances to step S810. If no instruction to shut down the OS 120 has been issued (NO in step S809), then the processing returns to step S804. When the operator of the information processing apparatus has pressed the software power button 303, the OS 120 determines that the instruction to shut down the OS 120 has been issued.

In step S810, the OS 120 executes the processing for shutting down the OS 120 to discontinue the operation of the OS 120.

Processing in steps S811 through S813, is executed if the result of the determination is negative in step S805.

When the result of the determination in step S805 is negative, the request from the application program is not a request for controlling the hardware device. The result of the determination in step S805 is negative if the application program has received a request for the device information or the driver information.

In step S811, the OS 120 determines whether the request from the application program is a device information acquisition request. If the request from the application program is a device information acquisition request (YES in step 811), then the processing advances to step S812. If the request from the application program is not a device information acquisition request (NO in step S811), then the processing advances to step S813.

In step S812, the OS 120 controls the device information management unit to transmit the device information to the application in response to the device information acquisition request from the application program.

The device information management unit 502 executes the processing in step S812 as the device information management unit if the skeleton driver 500 operates as the device driver. If the full driver 600 operates as the device driver, the device information management unit 602 executes the processing in step S812 as the device information management unit.

In step S813, because the request from the application program is the driver information acquisition request, the OS 120 controls the driver information management unit to transmit the driver information to the application.

If the skeleton driver 500 operates as the device driver, the driver information management unit 503 executes the processing in step S813 as the driver information management unit. If the full driver 600 operates as the device driver, the driver information management unit 603 executes the processing in step S813 as the driver information management unit.

The processing executed by the application program is described in detail below with reference to FIG. 9. FIG. 9 is a flow chart illustrating processing executed by the application program in booting the information processing apparatus according to the present embodiment. The "application program" may include any one of the above-described programs 142 through 146.

Figure 9:
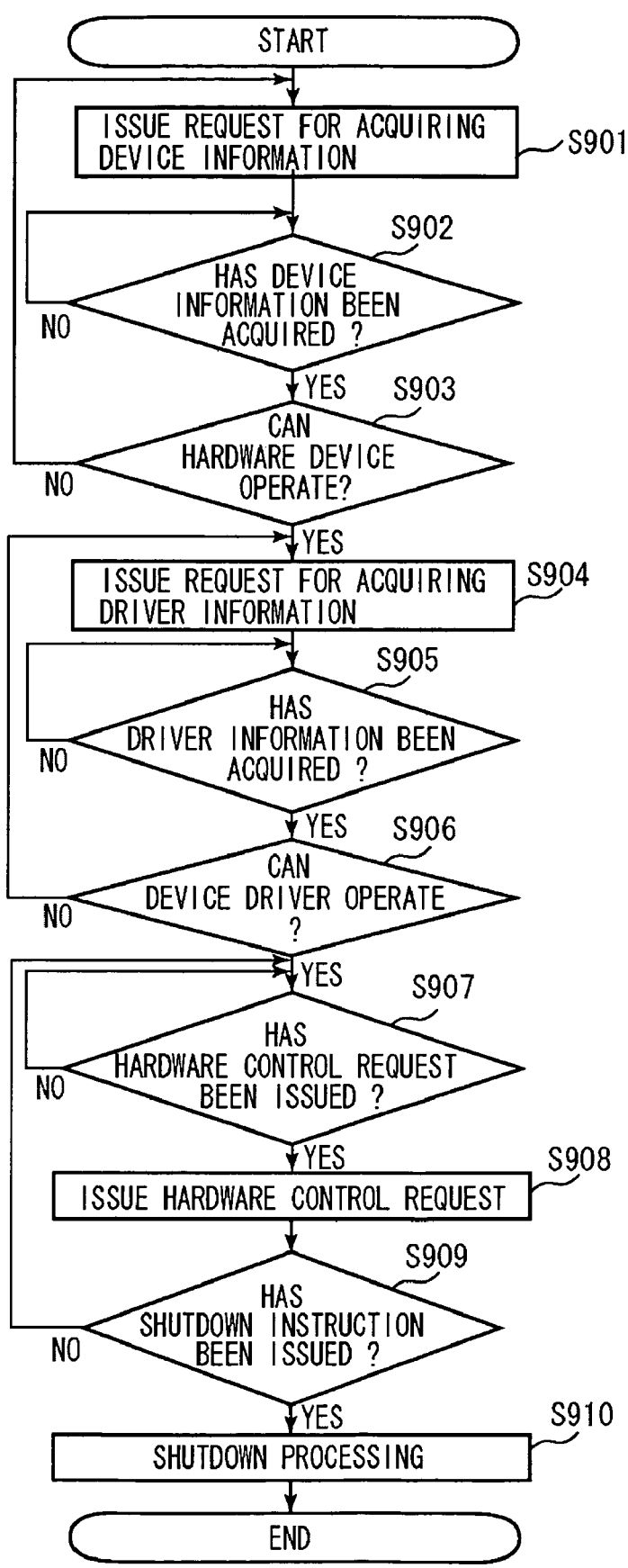
FIG. 9 is a flow chart illustrating exemplary processing executed by an application program in booting the information processing apparatus according to the first embodiment of the present invention.

Referring to FIG. 9, in step S901, the application program issues a request for the device information to the device driver corresponding to the hardware device utilized by the application program. The device information is acquired to verify that the hardware device utilized by the application program has been at least normally operating.

In step S902, the application program determines whether the device information has been acquired from the device driver. If the device information has not been acquired from the device driver (NO in step S902), the processing returns to step S902. If the device information has been acquired from the device driver (YES in step S902), then the processing advances to step S903.

In step S903, the application program refers to the device information acquired from the device driver and determines whether the hardware device is in the operable state. If the hardware device is not in the operable state (NO in step S903), the processing returns to step S901. If the hardware device is in the operable state (YES in step S903), then the processing advances to step S904. The application program determines that the hardware device is in the operable state if the received device information indicates that the hardware device has been normally operating.

In step S904, the application program issues a request for the driver information to the device driver corresponding to the hardware device utilized by the application program. The driver information is acquired to verify the operation status of the device driver corresponding to the hardware device utilized by the application program.

In step S905, the application program determines whether the driver information has been acquired from the device driver. If the driver information has not been acquired from the device driver (NO in step S905), the processing returns to step S905. If the driver information has been acquired from the device driver (YES in step S905), then the processing advances to step S906.

In step S906, the application program refers to the driver information acquired from the device driver and determines whether the device driver is in the operable state. If the device driver is not in the operable state (NO in step S906), the processing returns to step S904. If the device driver is in the operable state (YES in step S906), then the processing advances to step S907. The application program determines that the device driver is in the operable state if the driver information indicates that the device driver has been opened and is waiting for data to be input.

The application program cannot advance to step S907 unless hardware information and the driver information is acquired and it is verified that the hardware device and the device driver are in the operable state. Accordingly, the processing utilizing the hardware device cannot be executed unless the OS 120 has completely loaded the device driver and thus the device information and the driver information can be transmitted to the application program.

More specifically, it may be necessary for the device driver to be loaded for the application program to execute the processing utilizing the hardware device. Accordingly, the time taken to load the device driver determines the time taken to activate the application program.

In step S907, the application program determines whether a hardware control request for executing the processing utilizing the hardware device has been issued. If the hardware control request for executing the processing utilizing the hardware device has not been issued (NO in step S907), the processing returns to step S907. If the hardware control request for executing the processing utilizing the hardware device has been issued (YES in step S907), then the processing advances to step S908. If the application program is the facsimile transmission control application program 146, when a request for reading the document with the scanner is issued, then the result of the determination in step S907 is positive ("YES").

In step S908, the application program notifies the hardware control request to device driver. In step S909, the application program determines whether an instruction for shutting down the OS 120 has been issued to the application program. If the instruction to shut down the OS 120 has been issued to the application program (YES in step S909), then the processing advances to step S910. If no instruction to shut down the OS 120 has been issued to the application program (NO in step S909), then the processing returns to step S907. The application program determines that the instruction to shut down the OS 120 has been issued if the shutdown instruction has been issued from the OS 120.

As described above, in booting the information processing apparatus, the OS 120 loads the skeleton driver 500, which does not include the hardware control information for controlling the hardware device. Accordingly, the time taken to boot the information processing apparatus can be shortened compared to the case of loading the full driver 600, which includes the hardware control information.

If a request for controlling the hardware device has been issued from the application program, the present embodiment can appropriately respond to the request from the application program by loading the full driver 600. More specifically, with the above-described configuration, the present embodiment can reduce the time taken to boot the information processing apparatus having a hardware device while effectively preventing suspension of a part of processing executed by the application program utilizing the hardware device.

In the present embodiment, the skeleton driver 500 does not include the hardware control information. However, the present invention is not limited to this embodiment. More specifically, if the skeleton driver 500 does include at least a part of the hardware control information, the data size of the skeleton driver 500 may become larger than that where the skeleton driver 500 does not include the hardware control information at all but is smaller than that of the full driver 600. Accordingly, the present embodiment can also reduce the time taken to boot the information processing apparatus compared to that in the case of loading the full driver 600.

"A part of the hardware control information" can include various information such as control information used by the OS 120 for acquiring the version of manufacture of the hardware device via the hardware access unit.

In the present embodiment, the full driver 600 is loaded on the predetermined condition that the request for controlling the hardware device has been issued from the application program. However, the present invention is not limited to this embodiment. More specifically, it is also useful if the full driver 600 is loaded on a predetermined condition that when a timer, which starts counting when the operator presses the main power switch, has counted a predetermined count value (i.e., a predetermined length of time has elapsed). It is useful to set the timing for starting to count the elapsed time at the moment when the operator presses the main power switch or when the skeleton driver is loaded in step S802.

A second embodiment of the present invention is described in detail below. In the present embodiment, the information processing apparatus is an MFP having a plurality of functions such as a copy function, a facsimile transmission function, and a printer function. However, the present invention is not limited to this embodiment. A PC can be used as the information processing apparatus according to the present embodiment.

Both the first embodiment and the second embodiment use the skeleton driver and the full driver as the device driver for managing a specific hardware device. The second embodiment is different from the first embodiment in that the full driver according to the second embodiment does not include the device information management unit and a driver information management unit while the full driver according to the first embodiment does.

The second embodiment is different from the first embodiment in that the second embodiment always operates the skeleton driver while operating the full driver at the same time where necessary, contrary to the first embodiment, which operates either one of the skeleton driver and the full driver by switching between them.

The components and units of the second embodiment that are similar to those of the first embodiment are provided with the same reference numerals and symbols unless otherwise noted. Accordingly, the description thereof will not be repeated here.

Figure 10:
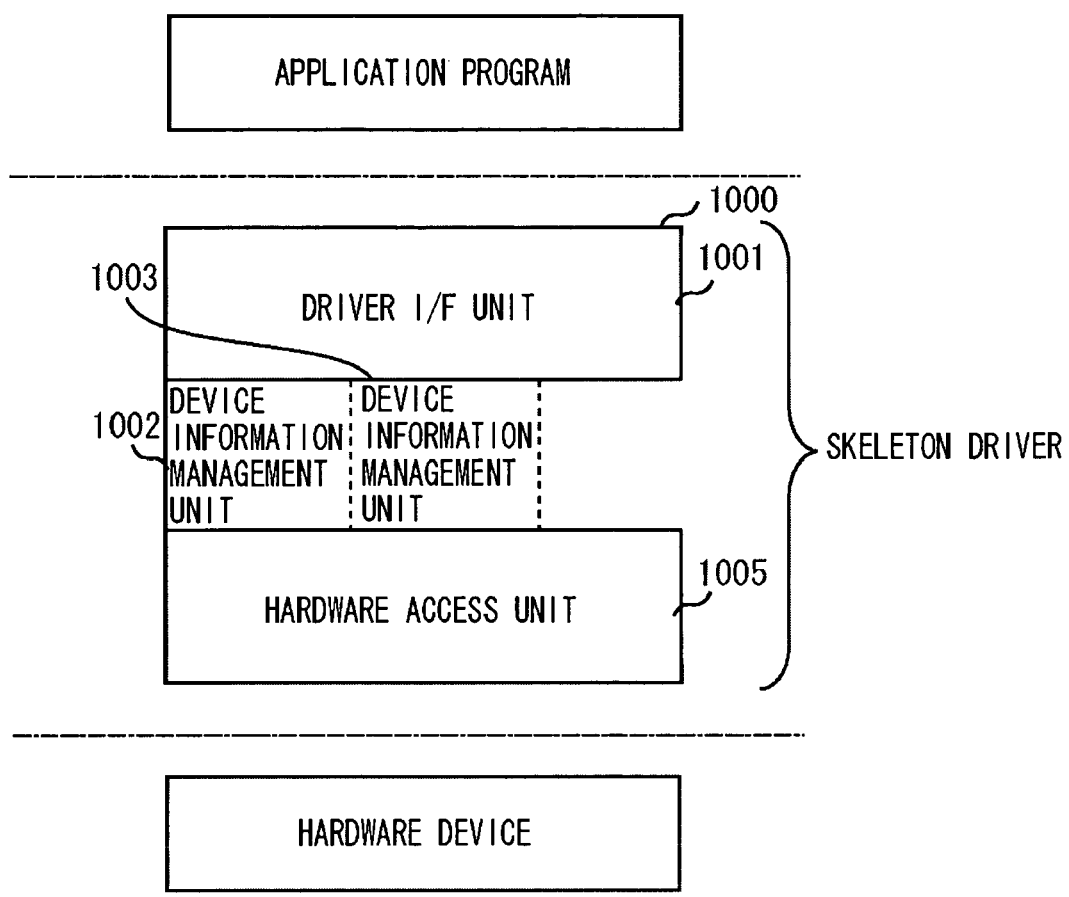
FIG. 10 illustrates an exemplary inner configuration of a skeleton driver according to a second embodiment of the present invention.

FIG. 10 illustrates an inner configuration of a skeleton driver 1000 according to the present embodiment.

The skeleton driver 1000 is different from the device driver illustrated in FIG. 4 in that the skeleton driver 1000 does not include a component equivalent to the hardware control unit 404.

Figure 11:
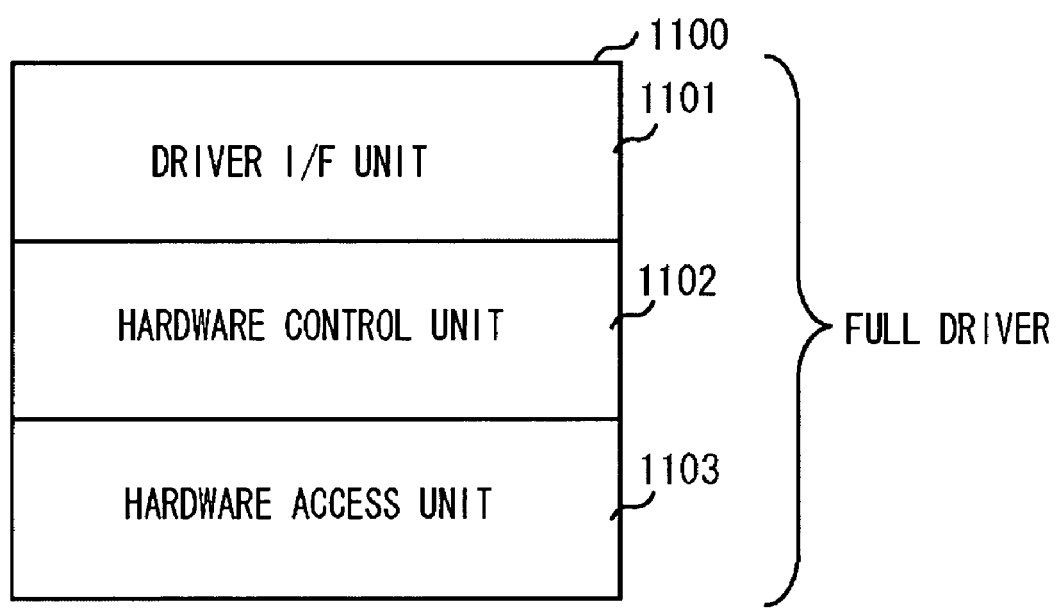
FIG. 11 illustrates an exemplary inner configuration of a full driver according to the second embodiment of the present invention.

FIG. 11 illustrates an inner configuration of a full driver 1100 according to the present embodiment.

A hardware control unit 1102 of the full driver 1100 illustrated in FIG. 11 has the same configuration as that of the hardware control unit 604 of the full driver 600 in the first embodiment.

Figure 12:
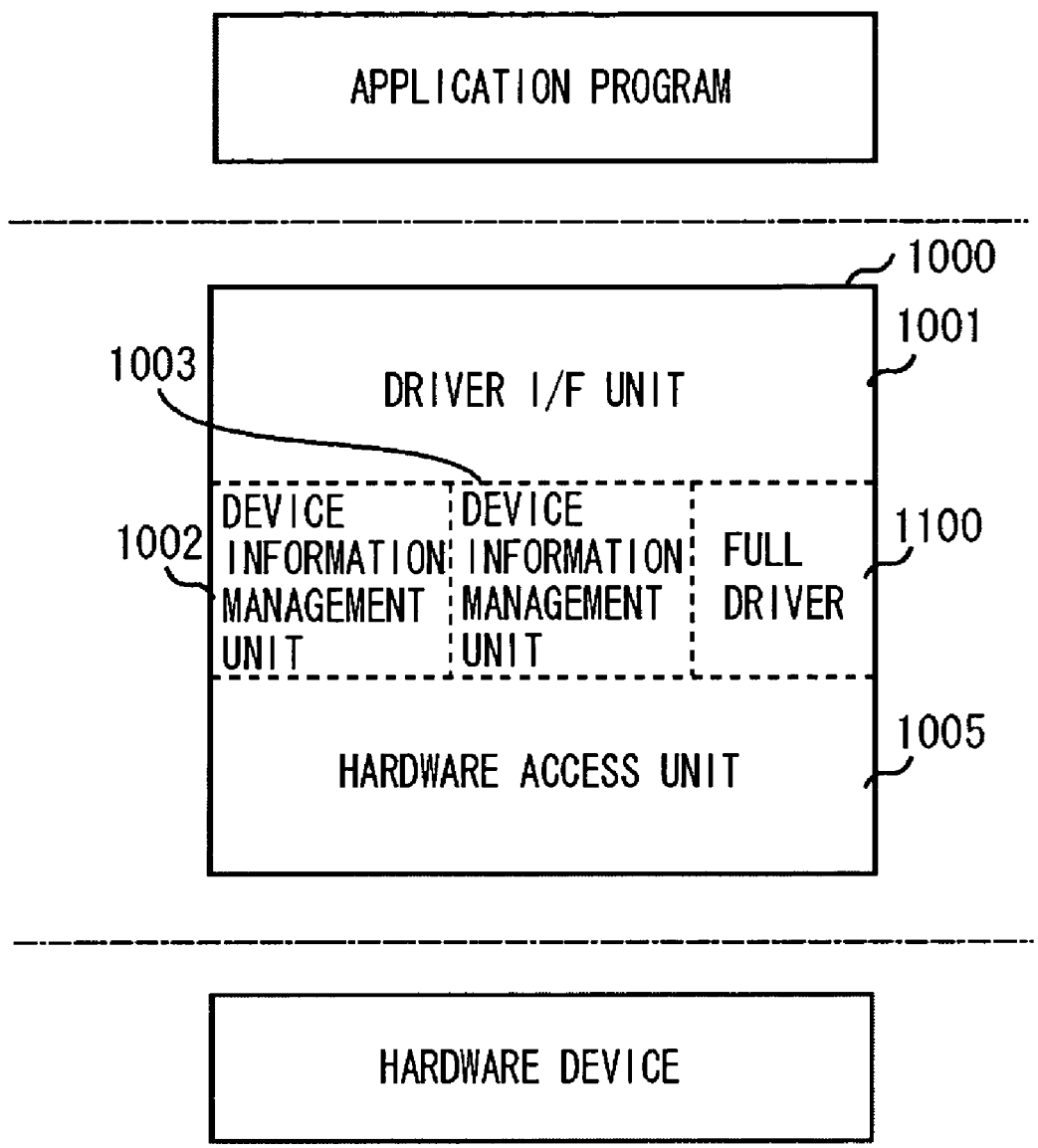
FIG. 12 illustrates the relationship between the skeleton driver and the full driver according to the second embodiment of the present invention.

A driver I/F 1101 illustrated in FIG. 11 is different from the driver I/F 601 of the full driver 600 in that the driver I/F 1101 is not a direct interface with the application program. The full driver 1100 is included in the skeleton driver 1000 as a part thereof after it is called from the skeleton driver 1000 as illustrated in FIG. 12. The driver I/F 1101 of the full driver 1100 includes a program that functions as an interface with the skeleton driver 1000.

A hardware access unit 1103 illustrated in FIG. 11, contrary to the hardware access unit 603 of the full driver 600, is not a direct interface with the hardware device. The full driver 1100 is included in the skeleton driver 1000 as a part thereof after it is called from the skeleton driver 1000 as illustrated in FIG. 12. The hardware access unit 1103 of the full driver 1100 includes a program that functions as an interface with the skeleton driver 1000.

The full driver 1100 according to the second embodiment does not function as a direct interface with the application program and the hardware device but is a direct interface with the skeleton driver 1000. Accordingly, the OS 120 can control the application program to access the skeleton driver 1000 every time the application program accesses the device driver.

It is not necessary for the OS 120 to switch the device driver to be accessed between the skeleton driver and the full driver. Instead of switching the device driver to be accessed between the skeleton driver and the full driver, the skeleton driver 1000 calls the full driver 1100 if a request for controlling the hardware device has been issued from the application program. The hardware control unit 1102 of the full driver 1100 transmits a response to the hardware control request from the application program.

In the present embodiment, the full driver 1100 does not include the device information management unit nor the driver information management unit. Therefore, the data size of the full driver 1100 is smaller than that of the full driver 600 of the first embodiment. Accordingly, the present embodiment can reduce the time taken to load the full driver 1100 compared to the time taken to load the device driver in the first embodiment.

In the present embodiment, the skeleton driver 1000 does not include the hardware control information. However, the present invention is not limited to this embodiment. More specifically, it is also useful if the skeleton driver 1000 does include at least a part of the hardware control information.

In this case, the data size of the skeleton driver 1000 may become larger than that in the case where the skeleton driver 1000 does not include the hardware control information at all but is smaller than that of the full driver 1100. Accordingly, the present embodiment can also reduce the time taken to boot the information processing apparatus compared to that in the case of loading the full driver 1100.

"A part of the hardware control information" can include various information such as control information used by the OS 120 for acquiring the version of manufacture of the hardware device via the hardware access unit.

A third embodiment of the present invention is described in detail below. In the present embodiment, the information processing apparatus is an MFP having a plurality of functions such as a copy function, a facsimile transmission function, and a printer function. However, the present invention is not limited to this embodiment. More specifically, a PC can be used as the information processing apparatus according to the present embodiment.

Both the first embodiment and the third embodiment use the full driver as the device driver for managing a specific hardware device. The third embodiment is different from the first embodiment in that the third embodiment does not use a skeleton driver while the first embodiment does.

If all the device drivers that can operate on the information processing apparatus are loaded at the same time during booting of the information processing apparatus, the time taken to boot the information processing apparatus may become long. Therefore, the present embodiment reduces the time for loading the device driver to boot the information processing apparatus.

The components and units of the third embodiment that are similar to those of the first embodiment are provided with the same reference numerals and symbols unless otherwise noted. Accordingly, the description thereof will not be repeated here.

FIG. 13 illustrates an example of a table indicating the wait time of the device drivers 123 through 128 corresponding to the hardware device that can operate on the information processing apparatus according to the present embodiment. In the present embodiment, the "wait time" refers to the time taken from the time the user has pressed the main power switch of the information processing apparatus to the time the OS 120 starts executing the device driver.

Referring to FIG. 13, the wait time of the device drivers 123 through 126 is "0 seconds". Accordingly, the device drivers 123 through 126 are loaded at the same time as the booting of the information processing apparatus starts. The wait time of the network driver 127 is approximately 20 seconds. Accordingly, the loading of the network driver 127 is started after twenty seconds has passed since the start of the booting of the information processing apparatus.

The wait time of the FAX driver 128 is approximately 25 seconds. Accordingly, the loading of the FAX driver 128 is started after twenty-five seconds has passed since the start of the booting of the information processing apparatus.

The present embodiment uses different loading time by applying the wait time such as "20 seconds" or "25 seconds" in loading a specific device driver. Accordingly, the present embodiment may reduce the time taken until the hardware device becomes usable (activated) after other device drivers have been loaded.

Processing executed by the OS 120 in booting the information processing apparatus is described in detail below with reference to FIGS. 14 and 15.

Figure 14:
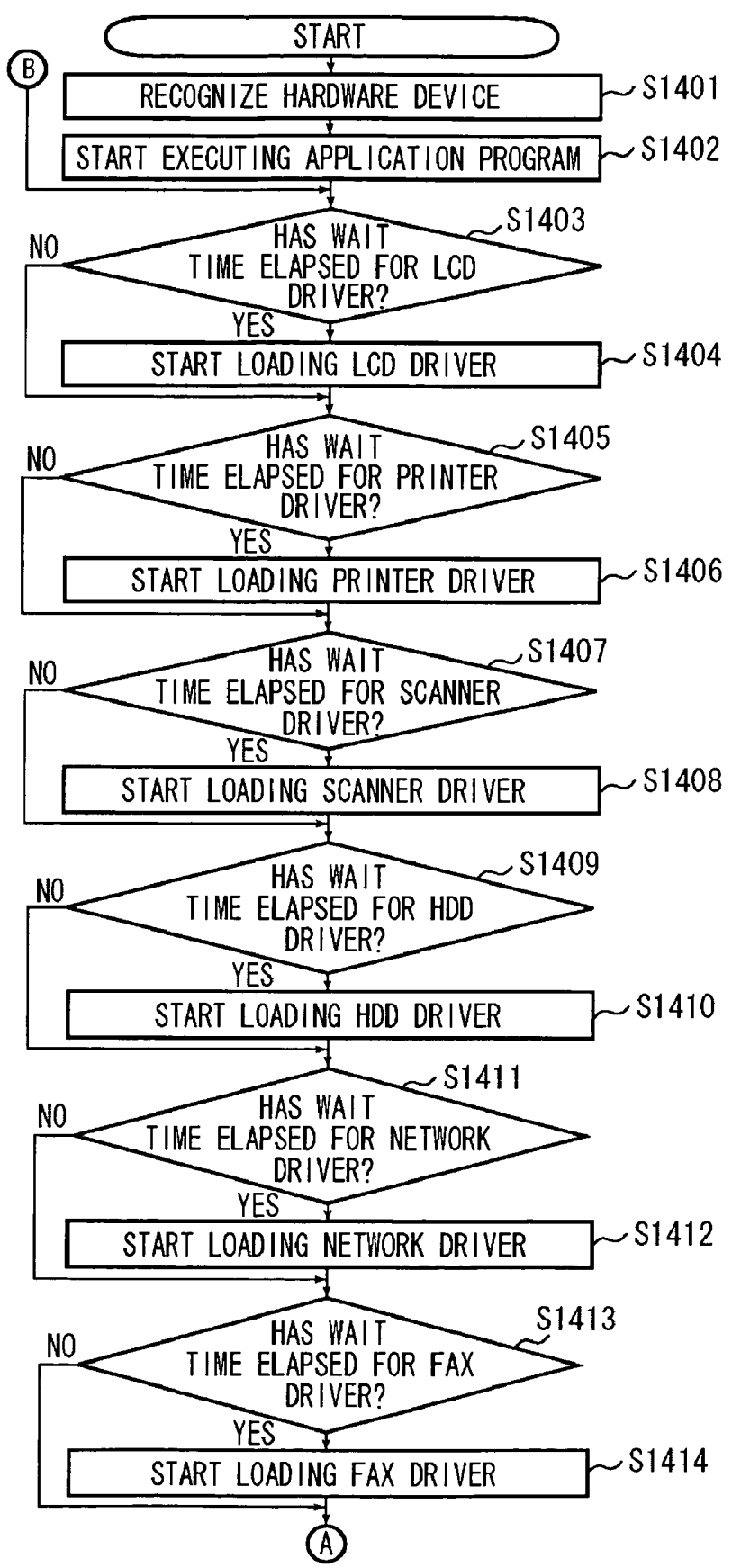
FIG. 14 is a flow chart illustrating exemplary processing executed by an OS of the information processing apparatus in booting the information processing apparatus according to the third embodiment of the present invention.
Figure 15:
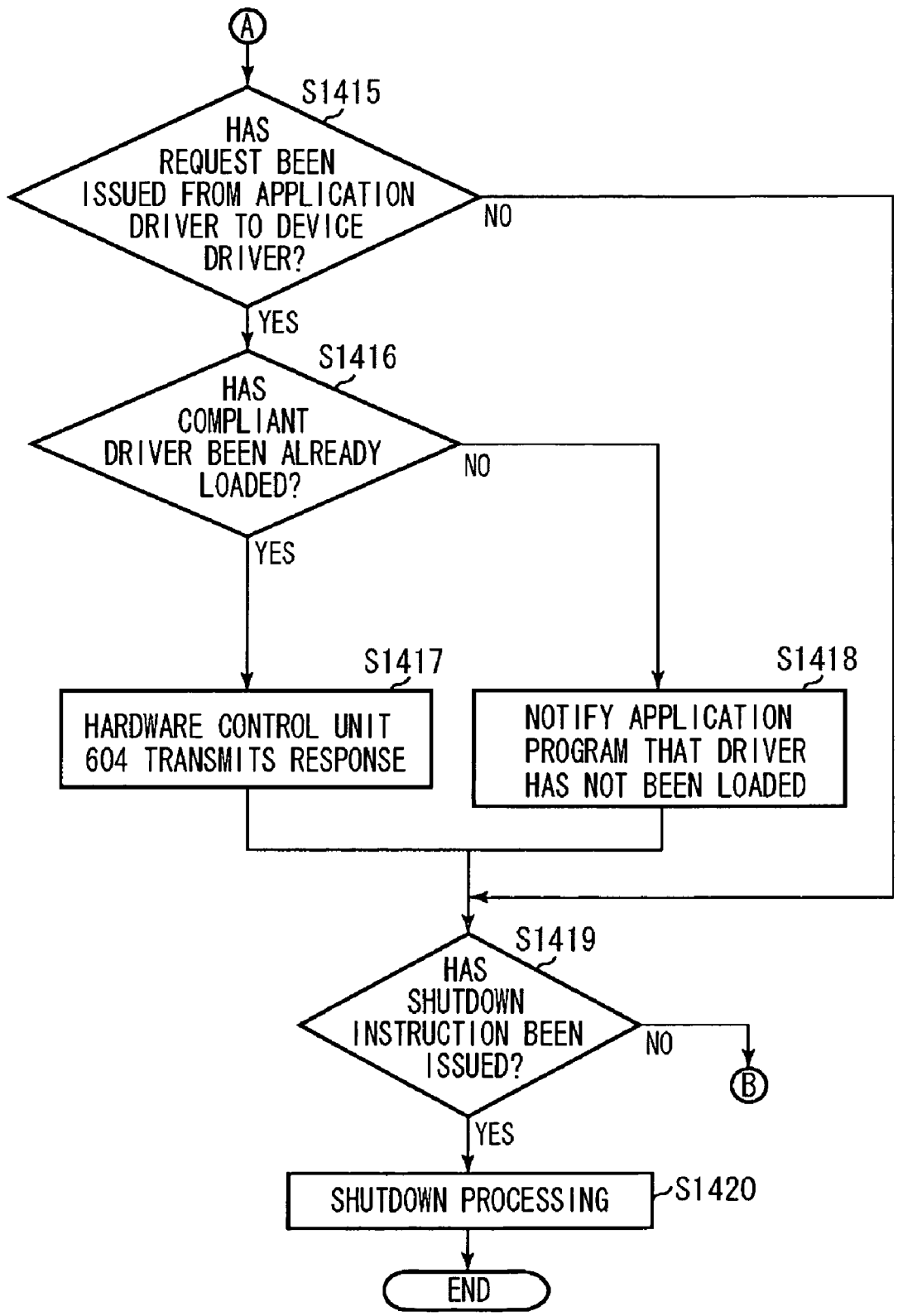
FIG. 15 is a flow chart illustrating exemplary processing executed by an OS of the information processing apparatus in booting the information processing apparatus according to the third embodiment of the present invention.

Referring to FIG. 14, in step S1401, the OS 120 recognizes the hardware device included in the information processing apparatus. The "hardware device" includes the device connected to the panel PHY 209 (FIG. 2), the printer PHY 214 (FIG. 2), the scanner PHY 125 (FIG. 2), the IDEPHY 210 (FIG. 2), the network PHY 208 (FIG. 2), or the FAXPHY 213 (FIG. 2).

In step S1402, the OS 120 starts executing the application program. The application program executed in step S1402 includes the programs 142 through 146 described above in the first embodiment. Because each application program has been stored on the HDD, the OS 120 loads the application program from the HDD on the DRAM 203.

The processing by the application program executed in step S1402 is the same as that described above in the first embodiment with reference to FIG. 9.

In step S1403, the OS 120 refers to the table illustrated in FIG. 13 and determines whether the wait time of the LCD driver 123 has elapsed. If the wait time of the LCD driver 123 has not elapsed (NO in step S1403), then the processing advances to step S1405. If the wait time of the LCD driver 123 has elapsed (YES in step S1403), then the processing advances to step S1404. In step S1404, the OS 120 loads the LCD driver 123 from the HDD on the DRAM 203.

In the present embodiment, a timer, which starts counting when the operator (user) has pressed the main power switch, is provided in the information processing apparatus. The OS 120 determines whether the wait time has elapsed based on the count value transmitted from the timer and the wait time illustrated in the table in FIG. 13.

In step S1405, the OS 120 refers to the table illustrated in FIG. 13 and determines whether the wait time of the printer driver 124 has elapsed. If the wait time of the printer driver 124 has not elapsed (NO in step S1405), then the processing advances to step S1407. If the wait time of the printer driver 124 has elapsed (YES in step S1405), then the processing advances to step S1406. In step S1406, the OS 120 loads the printer driver 124 from the HDD on the DRAM 203.

In step S1407, the OS 120 refers to the table illustrated in FIG. 13 and determines whether the wait time of the scanner driver 125 has elapsed. If the wait time of the scanner driver 125 has not elapsed (NO in step S1407), then the processing advances to step S1409. If the wait time of the scanner driver 125 has elapsed (YES in step S1407), then the processing advances to step S1408. In step S1408, the OS 120 loads the scanner driver 125 from the HDD on the DRAM 203.

In step S1409, the OS 120 refers to the table illustrated in FIG. 13 and determines whether the wait time of the HDD driver 126 has elapsed. If the wait time of the HDD driver 126 has not elapsed (NO in step S1409), then the processing advances to step S1411. If the wait time of the HDD driver 126 has elapsed (YES in step S1409), then the processing advances to step S1410. In step S1410, the OS 120 loads the HDD driver 126 from the HDD on the DRAM 203.

In step S1411, the OS 120 refers to the table illustrated in FIG. 13 and determines whether the wait time of the network driver 127 has elapsed. If the wait time of the network driver 127 has not elapsed (NO in step S1411), then the processing advances to step S1413. If the wait time of the network driver 127 has elapsed (YES in step S1411), then the processing advances to step S1412. In step S1412, the OS 120 loads the network driver 127 from the HDD on the DRAM 203.

In step S1413, the OS 120 refers to the table illustrated in FIG. 13 and determines whether the wait time of the FAX driver 128 has elapsed. If the wait time of the FAX driver 128 has not elapsed (NO in step S1413), then the processing advances to step S1415. If the wait time of the FAX driver 128 has elapsed (YES in step S1413), then the processing advances to step S1414. In step S1414, the OS 120 loads the FAX driver 128 from the HDD on the DRAM 203.

In step S1415, the OS 120 determines whether any request has been issued to the device driver from the application program staring execution in step S1402. If a request has been issued to the device driver from the application program (YES in step S1415), then the processing advances to step S1416. If no request has been issued to the device driver from the application program (NO in step S1415), then the processing advances to step S1419.

In step S1416, the OS 120 determines whether the device driver, execution of which has been requested in step S1415, has already been loaded. If the requested device driver has already been loaded (YES in step S1416), then the processing advances to step S1417. If the requested device driver has not been loaded yet (NO in step S1416), then the processing advances to step S1418.

In step S1417, the OS 120 transmits a response to the request from the application program received in step S1415 by using the hardware control unit 604 included in the device driver whose execution has been requested. In step S1418, the OS 120 notifies the application program that the device driver whose execution has been requested has not been loaded yet.

In step S1419, the OS 120 determines whether an instruction to shut down the OS 120 has been issued to the OS 120. If an instruction to shut down the OS 120 has been issued to the OS 120 (YES in step S1419), then the processing advances to step S1420. If no instruction to shut down the OS 120 has been issued to the OS 120 (NO in step S1419), then the processing returns to step S1403.

The OS 120 determines that the instruction to shut down the OS 120 has been issued when the operator of the information processing apparatus has pressed the software power button 303.

In step S1420, the OS 120 executes the processing to shut down the OS 120 to discontinue the operation of the OS 120.

The present embodiment can set the timing for loading a plurality of device drivers that can operate on the information processing apparatus separately and differently for each device driver. Accordingly, the present embodiment may reduce the time until a specific hardware device becomes usable by the device driver, compared to the case of loading all the device drivers that can operate on the information processing apparatus at the same time during booting of the information processing apparatus.

The table illustrated in FIG. 13 is an example. The wait time of each device driver can be arbitrarily set.

The present invention can also be achieved by providing a system or a device with a storage medium (or a recording medium) which stores program code of software implementing the functions of the embodiments and by reading and executing the program code stored in the storage medium, with a computer of the system or the device (a CPU or a micro processing unit (MPU)).

The program code is read from the storage medium, implements the functions of the embodiments mentioned above, and accordingly, the storage medium storing the program code constitutes the present invention.

While the present invention has been described with reference to various embodiments, it is to be understood that the invention is not limited to the disclosed embodiments. The scope of the following claims is to be accorded the broadest interpretation to encompass all modifications, equivalent structures, and functions.

This application claims priority from Japanese Patent Application No. 2008-096091 filed Apr. 2, 2008, which is hereby incorporated by reference herein in its entirety.

What is claimed is:

1. An information processing apparatus comprising:
a hardware device;
at least one application program configured to execute an operation utilizing the hardware device;
an operating system (OS) configured to manage the at least one application program;

a first device driver configured to manage the hardware device and includes hardware control information for controlling the hardware device;

a second device driver configured to manage the hardware device and includes device information about the hardware device, the second device driver not including at least a part of the hardware control information and having a data size less than the first device driver;

a first storage unit configured to store the first device driver and the second device driver;

a second storage unit configured to include a storage area for operating the first device driver and the second device driver via the OS, wherein the OS controls the first storage unit and the second storage unit to load the second device driver from the first storage unit on the storage area of the second storage unit in response to booting of the information processing apparatus and load the first device driver from the first storage unit on the storage area of the second storage unit when a predetermined condition is satisfied after booting the information processing apparatus, wherein the predetermined condition is a predetermined length of time that has elapsed after the information processing apparatus has booted.

2. The information processing apparatus according to claim 1, wherein the OS operates the first device driver and the second device driver as a device driver for controlling the hardware device after loading the first device driver on the storage area.

3. The information processing apparatus according to claim 1, wherein the first storage unit is a non-volatile storage unit, and the second storage unit is a volatile storage unit.

4. An information processing apparatus comprising:
a hardware device;
at least one application program configured to execute an operation utilizing the hardware device;
an operating system (OS) configured to manage the at least one application program;
a first device driver configured to manage the hardware device and includes hardware control information for controlling the hardware device;
a second device driver configured to manage the hardware device and includes device information about the hardware device, the second device driver not including at least a part of the hardware control information and having a data size less than the first device driver;
a first storage unit configured to store the first device driver and the second device driver;
a second storage unit configured to include a storage area for operating the first device driver and the second device driver via the OS, wherein the OS controls the first storage unit and the second storage unit to load the second device driver from the first storage unit on the storage area of the second storage unit in response to booting of the information processing apparatus and load the first device driver from the first storage unit on the storage area of the second storage unit when a predetermined condition is satisfied after booting the information processing apparatus, wherein the first device driver includes the device information, and the OS operates the first device driver as the device driver for controlling the hardware device after loading the first device driver on the storage area.

5. The information processing apparatus according to claim 4, wherein the OS executes control to delete the second device driver loaded on the storage area after loading the first device driver on the storage area.

6. An information processing apparatus comprising:
a hardware device;
at least one application program configured to execute an operation utilizing the hardware device;
an operating system (OS) configured to manage the at least one application program;
a first device driver configured to manage the hardware device and includes hardware control information for controlling the hardware device;
a second device driver configured to manage the hardware device and includes device information about the hardware device, the second device driver not including at least a part of the hardware control information and having a data size less than the first device driver;
a first storage unit configured to store the first device driver and the second device driver;
a second storage unit configured to include a storage area for operating the first device driver and the second device driver via the OS, wherein the OS controls the first storage unit and the second storage unit to load the second device driver from the first storage unit on the storage area of the second storage unit in response to booting of the information processing apparatus and load the first device driver from the first storage unit on the storage area of the second storage unit when a predetermined condition is satisfied after booting the information processing apparatus, wherein the second device driver includes driver information indicating an operation status of the second device driver.

7. A method for operating an information processing apparatus configured to include a hardware device, at least one application program configured to execute an operation utilizing the hardware device, an OS configured to manage the at least one application program, a first device driver configured to include hardware control information for controlling the hardware device, and a second device driver configured to include device information about the hardware device, the second driver not including at least a part of the hardware control information and having a data size less than the first device driver, the method comprising:
loading the second device driver from a first storage unit on a storage area of a second storage unit in response to booting of the information processing apparatus;
loading the first device driver from the first storage unit on the storage area of the second storage unit when a predetermined condition is satisfied after booting the information processing apparatus; and
operating at least one of the first device driver and the second device driver, which are loaded on the storage area, according to an instruction from the OS,
wherein the predetermined condition is a predetermined length of time that has elapsed after the information processing apparatus has booted.

8. The method according to claim 7, further comprising:
operating the first device driver and the second device driver as a device driver for controlling the hardware device after loading the first device driver on the storage area.

9. The method according to claim 7, wherein the first storage unit is a non-volatile storage unit, and the second storage unit is a volatile storage unit.

10. A method for operating an information processing apparatus configured to include a hardware device, at least one application program configured to execute an operation utilizing the hardware device, an OS configured to manage the at least one application program, a first device driver configured to include hardware control information for controlling the hardware device, and a second device driver configured to include device information about the hardware device, the second driver not including at least a part of the hardware control information and having a data size less than the first device driver, the method comprising:

loading the second device driver from a first storage unit on a storage area of a second storage unit in response to booting of the information processing apparatus;

loading the first device driver from the first storage unit on the storage area of the second storage unit when a predetermined condition is satisfied after booting the information processing apparatus; and operating at least one of the first device driver and the second device driver, which are loaded on the storage area, according to an instruction from the OS, wherein the first device driver includes device information about the hardware device, the method further comprising:

operating the first device driver as the device driver for controlling the hardware device after loading the first device driver on the storage area.

11. The method according to claim 10, further comprising:
deleting the second device driver loaded on the storage area of the second storage unit after loading the first device driver from the first storage unit on the storage area.

12. A method for operating an information processing apparatus configured to include a hardware device, at least one application program configured to execute an operation utilizing the hardware device, an OS configured to manage the at least one application program, a first device driver configured to include hardware control information for controlling the hardware device, and a second device driver configured to include device information about the hardware device, the second driver not including at least a part of the hardware control information and having a data size less than the first device driver, the method comprising:

loading the second device driver from a first storage unit on a storage area of a second storage unit in response to booting of the information processing apparatus;

loading the first device driver from the first storage unit on the storage area of the second storage unit when a predetermined condition is satisfied after booting the information processing apparatus; and operating at least one of the first device driver and the second device driver, which are loaded on the storage area, according to an instruction from the OS, wherein the second device driver includes driver information indicating an operation status of the second device driver.

* * * * *